(12) United States Patent
Lucas et al.

(10) Patent No.: US 6,284,077 B1
(45) Date of Patent: Sep. 4, 2001

(54) STABLE, FOAMED CAULK AND SEALANT COMPOUNDS AND METHODS OF USE THEREOF

(75) Inventors: Patrick J. Lucas, Springboro; Anthony J. Taylor, Medina, both of OH (US)

(73) Assignee: DAP Products Inc., Baltimore, MD (US)

( * ) Notice: Subject to any disclaimer, the term of this patent is extended or adjusted under 35 U.S.C. 154(b) by 0 days.

(21) Appl. No.: 09/269,001

(22) PCT Filed: Aug. 29, 1997

(86) PCT No.: PCT/US97/14173

§ 371 Date: Dec. 16, 1999

§ 102(e) Date: Dec. 16, 1999

(87) PCT Pub. No.: WO98/12248

PCT Pub. Date: Mar. 26, 1998

(51) Int. Cl.$^7$ ................................. C08J 9/28; C08J 9/30
(52) U.S. Cl. ................................ 156/77; 156/78; 156/79; 264/53; 427/207.1; 427/237; 427/244; 427/247; 521/65; 521/67; 521/78; 521/79
(58) Field of Search ............................. 521/78, 79, 67, 521/65; 427/207.1, 237, 244, 247; 156/77, 78, 79; 264/53

(56) References Cited

U.S. PATENT DOCUMENTS

| | | |
|---|---|---|
| 406,585 | 7/1889 | King . |
| 2,016,986 | 10/1935 | Case ........................................ 106/24 |
| 3,317,140 | 5/1967 | Smith .................................... 239/107 |
| 3,346,195 | 10/1967 | Groth .................................... 239/337 |
| 3,687,890 | 8/1972 | Susuki et al. ........................ 260/41 R |
| 3,705,669 | 12/1972 | Cox et al. .............................. 222/394 |
| 3,843,586 | 10/1974 | Wolf ................................ 260/29.7 R |
| 3,912,665 | 10/1975 | Spitzer et al. ...................... 260/2.5 E |
| 3,912,666 | 10/1975 | Spitzer et al. ...................... 260/2.5 E |
| 3,912,667 | 10/1975 | Spitzer et al. ...................... 260/2.5 E |
| 4,036,673 | 7/1977 | Murphy et al. ......................... 156/71 |
| 4,123,005 | 10/1978 | Blunk .................................... 239/327 |
| 4,277,568 | 7/1981 | Davison et al. ....................... 521/68 |
| 4,328,319 | 5/1982 | Osipow et al. ........................ 521/78 |
| 4,350,774 | 9/1982 | Scotti et al. ............................ 521/95 |
| 4,364,521 | 12/1982 | Stankowitz ........................... 239/346 |
| 4,381,066 | 4/1983 | Page et al. ............................ 222/394 |
| 4,384,661 | 5/1983 | Page et al. ............................ 222/394 |
| 4,422,877 | 12/1983 | Spitzer et al. ........................ 106/122 |
| 4,501,825 | 2/1985 | Magyar et al. ........................ 521/78 |
| 4,504,602 | 3/1985 | O'Connell et al. .................... 521/78 |
| 4,559,369 | 12/1985 | Bauman et al. ....................... 521/98 |
| 4,584,324 | 4/1986 | Bauman et al. ....................... 521/88 |
| 4,585,324 | 4/1986 | Koyama et al. ..................... 355/3 R |
| 4,692,473 | 9/1987 | Wright et al. ........................... 521/72 |
| 4,855,349 | 8/1989 | Ingle ..................................... 524/432 |
| 4,863,518 | 9/1989 | Blount ................................... 106/74 |
| 4,931,479 | 6/1990 | Morgan ................................. 521/76 |
| 4,940,844 | 7/1990 | Blunt ................................... 521/116 |
| 4,960,802 | 10/1990 | DiStefano ............................. 521/72 |
| 4,996,240 | 2/1991 | Osipow et al. ........................ 521/78 |
| 4,999,383 | 3/1991 | Blount ................................. 521/103 |
| 5,037,011 | 8/1991 | Woods ................................. 222/394 |
| 5,055,511 | 10/1991 | Ingle .................................... 524/406 |
| 5,073,445 | 12/1991 | Ingle ................................. 428/314.4 |
| 5,084,503 | 1/1992 | Iacoviello ............................ 524/459 |
| 5,089,160 | 2/1992 | Pallone et al. ........................ 252/90 |
| 5,120,607 | 6/1992 | Ingle ................................. 428/423.1 |
| 5,135,813 | 8/1992 | Ingle ................................. 428/423.1 |
| 5,180,753 | 1/1993 | Osipow et al. ........................ 521/65 |
| 5,188,263 | 2/1993 | Woods ................................. 222/394 |
| 5,252,622 | 10/1993 | DiStefano ............................. 521/65 |
| 5,254,599 | 10/1993 | Frank ................................... 521/65 |
| 5,331,016 | 7/1994 | Frank et al. ........................... 521/64 |
| 5,334,655 | 8/1994 | Carlson et al. ...................... 524/804 |
| 5,338,776 | 8/1994 | Peelor et al. ......................... 523/166 |
| 5,341,970 | 8/1994 | Woods ................................. 222/394 |
| 5,360,826 | 11/1994 | Egolf et al. ............................ 521/54 |
| 5,476,879 | 12/1995 | Woods et al. ......................... 521/78 |
| 5,480,589 | 1/1996 | Belser et al. .......................... 261/76 |
| 5,505,344 | 4/1996 | Woods ................................. 222/394 |

FOREIGN PATENT DOCUMENTS

| | | |
|---|---|---|
| 1151350 | 2/1983 | (CA) ..................................... 403/55 |
| 2947999 | 6/1980 | (DE) . |
| 2915467 | 10/1980 | (DE) . |
| 1536312 | 12/1978 | (GB) . |
| 9114724 | 10/1991 | (WO) . |
| 9319116 | 9/1993 | (WO) . |
| 9612759 | 5/1996 | (WO) . |

OTHER PUBLICATIONS

Surfactants and Interfacial Phenomena 2nd Edition, Milton J Rosen, pp. 293–299.

Handbook of Aerosol Technology Second Edition, Van Nostrand Reinhold Company, 1979, pp. 358–359.

*Primary Examiner*—Morton Foelak
(74) *Attorney, Agent, or Firm*—Biebel & French

(57) ABSTRACT

Stable foam caulk, sealant and insulation compositions are disclosed. The compositions comprise solid, waxy non-ionic lipophilic surfactants having low HLB values. These surfactants, upon foamed dispensing of the composition, provide stable support for bubbles formed from drying of a latex emulsion of a film forming polymer and a volatile liquid hydrocarbon propellant. In addition to use in caulking, sealant or insulation methods, the composition can be used to form artificial terrains and other hardenable structural surfaces as backgrounds or support means for hobbies, crafts, and the like.

13 Claims, 5 Drawing Sheets

STABLE, FOAMED CAULK AND SEALANT COMPOUNDS AND METHODS OF USE THEREOF

THIS APPLICATION IS A 371 OF PCT/US97/14173 FILED Aug, 29, 1997.

FIELD OF THE INVENTION

The present invention pertains to foamable compositions that, upon foamed release thereof from an aerosol canister or the like, present a stable foamed product capable of use as a caulk, sealant, or insulating compound.

BACKGROUND OF THE INVENTION

Caulking, insulation and sealant compositions are used to seal joints and other voids and to reinforce framing, tiles, panels, lathing, wall board and other structural assemblies. Foamed application of such compositions from pressurized containers and the like is highly desirable due primarily to overall ease of application. Easy clean up concerns require that such foamed products should be washed off with simple water and soap solutions.

Some of the available foamed compositions are not stable and shrink excessively after foamed application to the desired structure. Quite obviously, these products therefore fail in providing overall sealing or insulating efficacy. Moreover, other foamed products tend to sag or drip after application, again leading to failure.

It is accordingly an object to provide a foamable caulk, insulating or sealant composition that does not substantially shrink after application. It is another object to provide a foamable composition that, after foaming, may be easily cleaned with water and soap.

SUMMARY OF THE INVENTION

These and other objects are met by the foamable compositions of the instant invention. Compositions in accordance with the invention may be used, for example, to provide latex foam caulk and patching compounds, latex foam stucco including inside and outside wall treatment, ceiling and roof coatings and latex foam adhesives. The compositions may be disposed in pressurized aerosol containers for foamed caulk bead application or they may be contained within large pressurized bulkpacks having flexible hose or gun connectors associated therewith so that building contractors and the like may be readily supplied with larger quantities of the compositions.

Unlike polyurethane foam sealants, compositions in accordance with the invention may be simply washed with water. Current polyurethanes do not wash off but only wear off in time. Also, in contrast to polyurethane based products, the compositions will be more stable due to the urethane's propensity toward uncontrollable expansion. Additionally, foams in accordance with the invention are more "toolable" and provide smoother surfaces upon application than the urethanes.

The compositions in accordance with the invention comprise an aqueous latex emulsion of a film forming polymer. The latex emulsion is water dispersible and can accordingly be washed off the user's hands by soap and water.

The compositions in accordance with the invention further comprise a solid, lipophilic non-ionic surfactant having an HLB value of about 3 to about 8, more preferably about 3.5 to about 6. These surfactants are water insoluble and are chosen from the group of fatty acid (i.e., $C_{12}$ and greater) esters, fatty alcohol ethers and fatty acid amides. Most preferably, the surfactant comprises one or more ethoxylated fatty alcohols.

A host of liquifiable gaseous propellant components can be employed. However, it is preferred to use a combination of dimethyl ether (DME) and a volatile liquid hydrocarbon wherein the liquid hydrocarbon is present, by volume, in an amount greater than the DME.

Conventional fillers may also be added to the composition to provide anti-sagging or desired pigmentation.

The invention will be further described in conjunction with the appended drawings and detailed description.

DETAILED DESCRIPTION OF THE INVENTION

Figure 1:
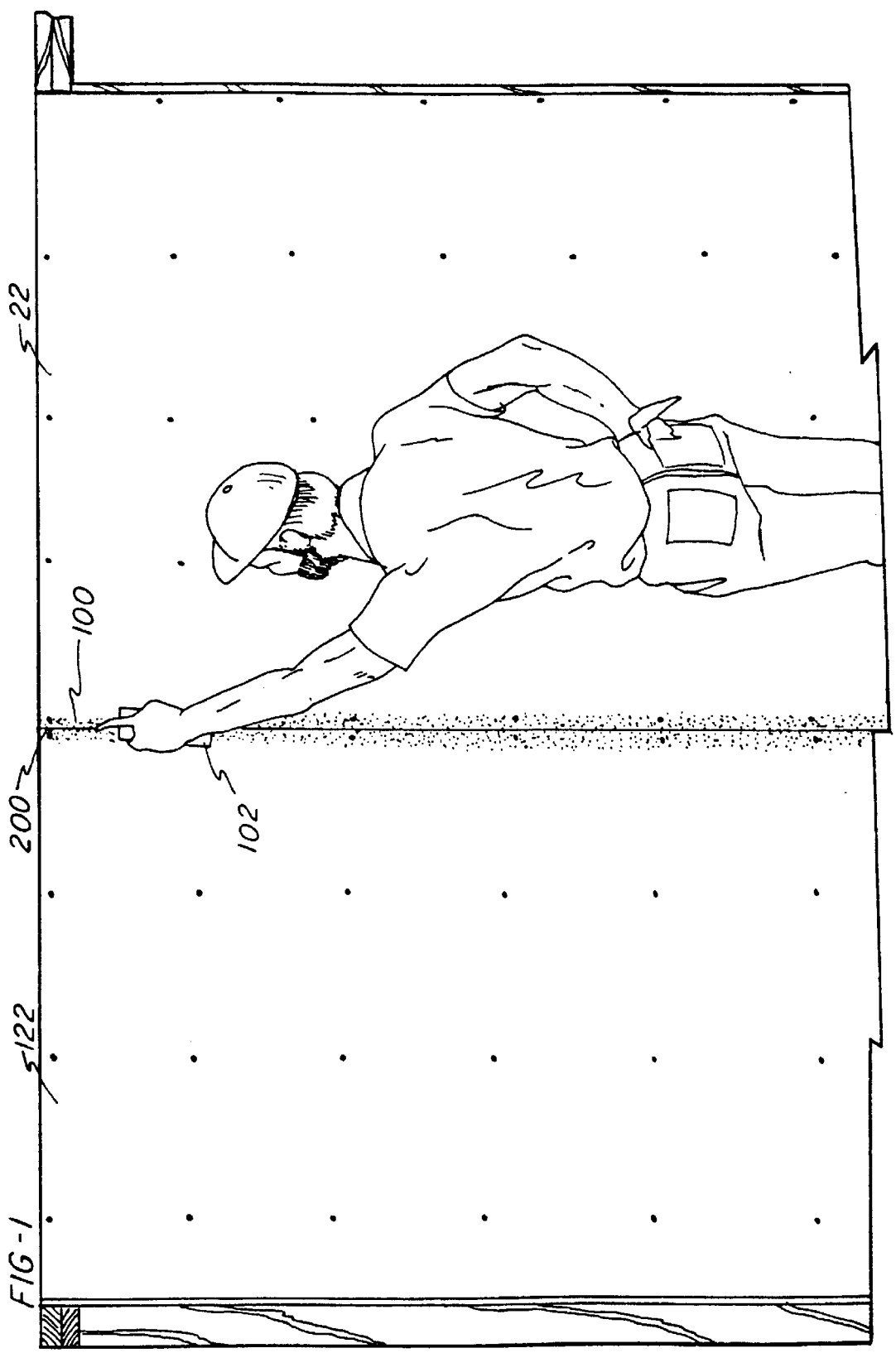
FIG. 1 is a schematic view showing use of the foamable compositions of the invention as a caulk to fill the gaps existing between adjacent wall board panels of a building.

The compositions of the invention are contained, before foaming, in an aerosol or larger bulk quantity container that, after loading with the composition, is charged to sufficient pressure to expel a foamed bead or rope-like strand of material from the housing. Such containers are well known in the art and need not be explained herein. Suffice it here to state that such containers are operatively associated with sufficient value means so as to selectively open the container thereby allowing expulsion of the pressurized components housed therein and to close the container after the desired foamed application. One aerosol container that may be adapted for use in providing a foamed caulk-like product in accordance with the invention is shown in U.S. Pat. No. 3,705,669 (Cox).

The compositions of the invention comprise a film forming polymer present in emulsion form. The film forming polymer may be defined as being dispersible by water when in emulsion form and, the polymer itself is either dispersible in or soluble in the liquid propellant as shall be further specified herein. By film forming we mean that the polymer, after evaporation of the propellant, should remain in the form of a cohesive foam. Generally, thermoplastic polymers as a class are acceptable as film forming polymers. Polymers derived from ethylenically unsaturated compounds such as styrene and/or acrylic acid and its lower alkyl esters may be mentioned as exemplary along with other vinyl compounds such as vinyl acetate, vinyl butvrate etc. An exemplary listing of suitable film forming polymers can be seen in U.S. Pat. No. 4,381,066—incorporated by reference herein.

Preferred are latex emulsions comprising acrylic acid, lower alkyl acrylates, styrene, vinyl acetate and/or ethylene based polymers. One preferred combination is a combination of a styrene/acrylic copolymer with a vinylacetateleth-ylene copolymer. The glass transition temperatures of the polymeric constituents can vary over a wide range of about 40 to about 110° C. depending on the degree of hardness ultimately desired for the foam.

The propellant constituents can be chosen from a wide variety of known propellants such as the $C_1$–$C_6$ alkanes and $C_1$–$C_6$ alkenes. In this regard, volatile liquid hydrocarbons such as propane, n-butane, isobutane, hexane, n-pentane, 2-methylbutane, 1-pentene, butene, 2-methyl-2-butene, cyclobutane, cyclopentane, and cyclohexane can be employed. Less desirably, hologenated hydrocarbons such as vinyl chloride, methyl chloride, methylbromide, dichlorodifluoromethane 1,1,1,2-tetra fluoro ethane and 1,1-difluoroethane etc. may be employed although some of these are not favored due to environment concerns. A detailed listing of liquid propellants may be seen in U.S. Pat. No. 4,381,066 (Page) incorporated by reference herein.

In addition to the volatile liquid hydrocarbon component described above, the propellant preferably comprises dimethyl ether (DME). The amount of the DME in the propellant composition is controlled so that the volatile liquid hydrocarbon is present in a volumetrically greater amount than the DME. For example the volatile liquid hydrocarbon should be present in an amount (by volume) of 1–5:1, preferably 2:1 volatile liquid hydrocarbon: DME.

It has been found that use of DME in the propellant enhances quick drying of the resulting foams. The propellant is added to the foamable composition in an amount of 2–10 wt % based on the total composition weight. Preferably, the propellant is present in an amount of between about 4–6 wt %.

The choice of surfactant to be employed is an important one. The surfactant should be a non-ionic solid, waxy lipophilic compound having an HLB value of about 3-about 8, preferably about 3.5-about 6. These surfactants are water insoluble and are chosen from fatty (i.e., $C_{12}$ or greater) acid esters, fatty alcohol ethers and fatty acid amides.

As to the fatty alcohol ethers, these include alkoxylated (preferably Et—O—) fatty alcohols.

Preliminary results have indicated that the following surfactant types are effective:

ethoxylated fatty alcohols fatty acid amides fatty acid esters

In addition to the above components, the foamable compositions may also comprise a dispersant/solvent such as isopropanol to aid in dispersing the surfactant. Isopropanol also aids in foam drying and acts as a heat sink when the solid surfactant is melted and mixed during preparation of the foamable formulation.

Other components including fillers such as silica. asbestos, chalk, titanium dioxide, zinc oxide, siloxanes, sundry other pigments and calcium carbonate can optionally be added. Ethylene glycol and other freeze-thaw agents can be included in the formulation. Flame retardant compounds can also be noted as possibly being added. These include antimony oxides, brominated and chlorinated paraffins, $Al(OH)_3$ and aromatic flame retardants. All of these compounds are referred to herein broadly as "fillers."

In addition, water repellent compounds can be included in the formulation as needed. In this regard a host of such compounds are commercially available and could be used. Exemplary water repellent compounds include the siloxanes, waxes and cationic water repellents. Preliminary data suggests that the cationic water repellents provide enhanced water repelling function without causing excessive "sag" in the foamed formulation. At present, the cationic amines such as the quaternary ammonium salts are preferred. One such product is available under the trademark Mackernium SDC-85 from McIntyre Group Ltd., University Park, Illinois. This product is a stearalkonium chloride available in flake form.

If ferrous metal containers are used to house the formulation, it may be desirable to add a minor amount of a rust inhibitor component to the formulation. These again are available from many commercial suppliers. One such exemplary rust inhibitor is available from Raybo Chemical Co., under the trademark "Raybo 60 No Rust".

Anti-microbial agents such as fungicides, algaecides, miidewicides, etc. may also be added to the formulation. One such fungicide is sold under the mark "Polyphase AF1" and is available from Troy Chemical.

Exemplary compositions include the following components:

| | | |
|---|---|---|
| (a) film forming o/w polymer emulsion | 50–98 | (wt % based upon weight of foamable composition prior to charge of propellant) |
| (b) surfactants | 1–10 | (wt % based upon weight of foamable composition prior to charge of propellant) |
| (c) dispersant/solvent | 1–10 | (wt % based upon weight of foamable composition prior to charge of propellant) |
| (d) fillers | 0–40 | (wt % based upon weight of foamable composition prior to charge of propellant) |
| (e) water repellents | 0–5 | (wt % based upon weight of foamable composition prior to charge of propellant) |
| (f) rust inhibitors | 0–5 | (wt % based upon weight of foamable composition prior to charge of propellant) |
| (g) anti microbial agents | 0–5 | (wt % based upon weight of foamable composition prior to charge of propellant) |
| (a) (b) (c) (d) (e) (f) and (g) add up to 100 wt % | | |
| propellant | 2–10 | (wt % based upon weight of the composition including propellant) |

Usually, the surfactants and water repellants are melted and mixed with the dispersant/solvent. This resulting mixture is mixed with the requisite polymer emulsion or emulsions and then the desired filler compounds, as described above, are added. The propellant charge is then added in an amount of about 2–10 wt % which brings pressure within the container up to around 10 psig at room temperature.

EXAMPLES

A variety of different surfactant types were screened to see which ones could possibly be employed to provide a stable foam caulking and sealant composition. The following screening tests were employed.

Preparation of Screening Formulations The requisite surfactants were added to and mixed with isopropanol. In those cases in which the surfactants were present in solid form, they were melted prior to mixing. After the resulting mixture was stirred, the requisite polymer latex(s) were then added. About 340 grams of the resulting emulsion were then charged into an aerosol container along with a liquid propellant mixture comprising "A-70" liquid hydrocarbon propellant (i.e., propane, n-butane and isobutane) and dimethylether (DME). The total charge of propellant was about 4–6 wt % based on the combined weight of the emulsion and propellant. The "A-70" was present in an amount of 2:1 by volume "A-70":DME.

Expansion Tests

The screening formulations were then sprayed from the canister in the form of foam-like beads. The initial height of each bead was measured and then the height was measured again after 18–24 hours. Expansion (or contraction) was measured in accordance with formula $$\text{bead height after 18–24 hours}^2/\text{initial bead height} = \text{volumetric increase}$$

Volumetric increases of the order of about 0.45 and greater were deemed acceptable to pass the screening tests. Most desirable are expansions of about 0.6 to 1.0 and greater with expansion values of about 1 and greater clearly preferred.

Softness Test 40 hours after form beads of the formulations had been produced, a penetrometer was used to measure the depth of needle penetration into each of the test samples. Penetration of less than about 10 mm was deemed acceptable as exhibiting the necessary hardening characteristics desirable for a caulk or insulation material.

$H_2O$ Absorption

A one inch foam barrier was extruded on top of a one and one-half inch cotton barrier sample in an eight ounce cup. The foam was allowed to dry for about 40 hrs. The cups were immersed in a flow (80 ml/min+/−10) of tap water for about one minute. The increase in weight of the foam/cup sample was measured.

Screening Formulations Tested

Unless otherwise noted, tested formulations were as follows:

(1) surfactant≈2 wt %
(2) IPA≈1.5wt %
(3) film forming polymer≈60 wt %
(4) water≈remainder

EXAMPLE 1

The following compositions shown in Table 1 were deemed to pass the screening tests due primarily to their ability to form stable foam beads as especially seen by satisfactory performance of about 0.45 and greater in the expansion tests. By use of the term "stable" we mean that the foams do not substantially collapse upon drying. The fact that candidates pass this initial screening does not mean absolutely that these formulations would provide an commercially viable product. After initial product screening, additional tests were undertaken, leading to the determination of the preferred embodiment noted infra.

Candidates Passing The Screening Tests

TABLE 1

SURFACTANT

| Brand Name | Chemical Family | Chemical Description | HLB | Expansion | Softness | $H_2O$ Regain |
|---|---|---|---|---|---|---|
| 1. Hetoxol CA-2(a) | Ethoxylated alcohol | ethoxylated (2) cetyl alcohol | 5.1 | 1.32 | 4.3 | 0.03 |
| 2. Brij 52 (b) | Ethoxylated $C_{16}$ ether | POE(2) hexadecylether | 5.3 | 0.95 | X | X |
| 3. Paramul (c) SAS | Fatty amido-ester | stearamide DIBA stearate | * | 0.92 | X | X |
| 4. Pegosperse(d) 100 S | PEG fatty ester | Mixture of stearic acid = 45% diethyleneglycol monostearate = 35% diethyleneglycol distearate = 10% diethylene glycol = 5% potassium stearate = 5% | 3.8 | 0.89 | 5.5 | 0.28 |
| 5. Brij 52 (3) and Brij 72 | Ethoxylated ethers | POE(2) $C_{16}$ & $C_{18}$ ethers in a 1:1 ratio | ≈5 | 0.66 | X | X |
| 6. Brij 72 (e) | Ethoxylated ethers | POE(2) $C_{18}$ ether | 4.9 | 0.49 | X | X |
| 7. Lipocol (f) SC-4 | POE $C_{16}$ & $C_{18}$ ethers | Cetyl ether & stearyl ether POE(4) | 8 | 0.46 | X | X | a = available from Heterene Inc.
b = available from ICI Surfactants
c = available from Bernel Chemical Co., Inc.
d = available from ICI Surfactants
e = available from ICI Surfactants
f = available from Lipo Chemicals Inc.
* = postulated HLB of about 5

One other surfactant combination, namely Incroquat CR, in a 5.5 wt % amount passed the screening test. This surfactant is a surfactant blend including $C_{16}$ OH and PEG (40) castor oil in combination with stearylalkonium chloride.

Candidate Failures

Formulations including the following surfactant components were deemed to fail. (Table 2)

TABLE 2

| NAME | CHEMICAL FAMILY | CHEMICAL DESCRIPTION | HLB | EXPANSION | SOFTNESS | H2O abs. |
|---|---|---|---|---|---|---|
| | | NON-IONIC SURFACTANTS | | | | |
| Polawax A-31 | Emulsifying wax | Emulsifying wax | X | 0.38 | 2.8 | X |
| Brij 58 | Ethoxylated alcohol | POE (20) cetyl ether | 15.7 | 0.28 | X | X |
| Amiter LGS-5 | Protein/difatty (POE) ester | POE(5)ether diester of N-lauroyl L-glutamic acid | 5.4 | 0.19 | 4.2 | X |
| Glyosperse TS-20 | POE fatty esters & oils | POE(20)sorbitan tristearate | 11 | 0.18 | X | X |
| Brij 35 | POE C12 fatty ether | POE(23)lauryl ether | 16.9 | 0.16 | X | X |
| General 122 N = 5 | Ethoxylated alcohol | PEG-5 soya sterol | 7 | 0.15 | 3.8 | X |
| Armul 930 | POE alkylphenol | Nonylphenol POE glycol ether | 17.1 | 0.15 | X | X |
| Phospholipon 50 G | Lecithin derivative | Lecithin | X | 0.14 | X | X |
| Ariasolve 200 | POE C16 fatty ether | POE(20) isohexadecyl ether | 15.7 | 0.14 | X | X |
| Brij 98 | POE C18 fatty ether | POE(20) oleyl ether | 15.3 | 0.13 | X | X |
| Cedapal CA-890 | POE alkyl phenol | Octoxynol-100 | 18 | 0.13 | X | X |
| Pegosperse 50 DS | Glycol Distearate | Ethylene Glycol Distearate | 2.0 | 0 | X | X |
| Pegosperse 50 MS | Glycol Stearate | Ethylene Glycol Monostearate | 3.0 | 0 | X | X |
| Span 65 | Sorbitan Ester | Sorbitan Tristearate | 2.1 | 0 | X | X |
| Super Hartolan | Lanolin Based Derivatives | Lanolin Alcohols (Mixture of Fatty OH, Steroid, Triterpenoid OH) | 4 | 0.06 | X | X |
| Amiter LGS-5(H) | Protein Based Surfactant | POE(%)Stearyl ether diester of N-Lauroyl L-Glutamic Acid | 5.4 | 0.19 | X | X |
| Glucate SS | Glucose Derivative | Methyl Glucose Sesquisterate | 6 | 0 | X | X |
| Imwitor 312 | Glycerol esters | Mono & Di C12 Glyceryl Esters some C10 & 1, 2, 3-propanetriol | 6 | 0 | X | X |
| Polyaldo HGDS KFFG | C16 & C18 Fatty Esters | Hexaglyceryl Distearate | 7 | 0 | X | X |
| General 122 N = 5 | Ethoxylated Alcohol | PEG-5 Soya Sterol | 7 | 0.15 | X | X |
| Hetoxamate 400 DS | Glycol Esters | PEG-8 Distearate | 10.6 | 0 | X | X |
| Chemax HCO-25 | Ethoxylated Fatty Esters | Ethoxylated Hydrogenated Castor Oil | 10.8 | 0 | X | X |
| Span60 | Sorbitan fatty acid ester | Sorbitan Monostearate | 4.7 | 0.00 | X | X |
| Span40 | Sorbitan fatty acid ester | Sorbitan monopalmitate | 6.7 | 0.02 | X | X |
| | | CATIONIC SURFACTANTS | | | | |
| Mackemium EQ-15 | Quaternary Amine | Triethanolamine tallow diester | X | 0.50 | 0.6 | X |
| Armeen 2C | Amine | Di(cocoalkyl)amines | X | 0.37 | X | X |
| Emkalon Base C-100 | Lanoline based derivative | POE cholesteryl & isocholesteryol fatty esters | X | 0.22 | 1.4 | X |
| Lexemul AR | Glycerides: C14–C18 | Octadecanamide, N-(2(Diethylamino)ethyl)- | X | 0.21 | X | X |
| Armac HT flk | Amine acetates | Hydrogenated tallowalkyl amine acetates | X | 0.16 | X | X |
| | | ANIONIC SURFACTANTS | | | | |
| Norfox Oleic Flks | Soap | Sodium oleate | 20 | 0.39 | X | X |
| Cerasyat Q | Glycerol esters | Glycerol stearate/glycerin/K stearate | X | 0.32 | 1.3 | X |
| Lexemul T | Glycerol esters, C14–C18 | Potassium soap of fatty acids | 5.5 | 0.24 | 0.9 | X |

Discussion

In accordance with the above, success was shown when Examples 1–7 were screened. The surfactants employed in these formulations were all water insoluble, solid, crystalline, lipophilic surfactants having HLB's of about 3–8 preferably 3.5–6. Chemically, these surfactants fall within the classes of fatty acid ($C_{12}$ and greater) esters, fatty alcohol ethers and fatty amides. In some cases, surfactants falling within the general chemical classes and HLB values described in the preceding sentence failed the initial screening study. It appears that such failures may be attributable to stearic hindrance factors which prohibit proper surfactant functioning at the w/o interface in the foamable formulation. Generally speaking these stearic hindrance problems appear to arise in conjunction with surfactant conformations that include bulky substituents such as ring structures, triester functionality, the location of more than 1 glycol group between ester groups, and glycerol esters.

One exemplary formulation includes a combination of three different water insoluble solid, crystalline surfactants having HLB's of between about 2-about 8. The surfactants are:

| | | M.P. |
|---|---|---|
| Brij 52 | Polyoxyethylene(2) cetyl alcohol | 86.0–93.2° F. |
| Brij 72 | Polyoxyethylene(2) stearyl ether | 105.8–133° F. |
| Pegosperse 5ODS | ethylene glycol distearate | 136.4–147.2° F. |

It is thought that the staggered melting points of the surfactant blend enhance the foam bubble stability in that the lowest m.p. surfactant tends to crystallize last with the highest m.p. surfactant crystallizing first. The Pegosperse 5ODS has been added to give water resistance and hardness to the resulting foam even though when used by itself as a surfactant, it did not produce a stable foam (see Table 2 supra.).

Based on presently available data, the composition preferred for use is as follows.

| Formulation 1 | |
|---|---|
| Brij 52 | 1.0% |
| Brij 72 | 0.7% |
| Mackernium SDC-85 | 0.7% |
| IPA | 4.0% |
| Ethylene Glycol | 2.0% |
| Polyphase AF-1 | 0.2% |
| Raybo 60 No Rust | 1.25% |
| Polymer a) Styrene/acrylic copolymer; solids = 48.5%, $T_g \approx 103°$ C. Lucidene 370, available Morton International Solids present | 21.86% |
| b) Polyvinyl acetate/ ethylene copolymer; solids = 72.0%; $T_g \approx 0°$ C.; Airflex 720 BP, available Air Products Solids present | 32.45% |
| water | remainder |

Other exemplary (but not preferred) compositions include:

| Formulation 2 | |
|---|---|
| Brij 52 | 1.0% |
| Brij 72 | 0.7% |
| Pegosperse 5ODS | 0.7% |
| IPA | 4.0% |
| Ethylene Glycol | 2.0% |
| Polymer a) Styrene/acrylic copolymer; solids = 48.5%, $T_g \approx 103°$ C. Lucidene 370, available Morton International Solids present | 22.21% |
| b) Polyvinyl acetate/ ethylene copolymer; solids = 72.0%; $T_g \approx 0°$ C.; Airflex 720 BP, available Air Products Solids present | 32.98% |
| water | remainder |

| Formulation 3 | | |
|---|---|---|
| Hetoxol | ethoxylated(2) cetyl alcohol | 1.8% |
| IPA | | 4.0% |
| Ethlyene Glycol | | 2.0 |
| Styrene/acrylic copolymer | | 22.36 |
| Polyvinlacetate/ethylene copolymer | | 33.19 |
| water | | remainder |

To these emulsions, a propellant as described above (preferably 2:1, volume A-70: DME) is added in an amount of 4.95% based on the weight of all components (including propellant) present.

Although applicant is not to be bound to any particular theory of operation, it is thought that the solid lipophilic surfactant coats the volatile liquid hydrocarbon propellant component as the formulation is expelled from the pressurized can. The surfactant, upon foam dispensing, changes from the liquid phase into the solid phase where it is positioned along the water/organic interface. At that location, the surfactant functions as a foam builder, supporting the bubbles formed by the volatile liquid hydrocarbon and surrounding polymer emulsion. Upon evaporation of the propellant and water from the emulsion, the polymer bubbles are stabilized by the waxy surfactant and polymer solids.

The foamable compositions in accordance with the invention can be utilized to fill joints, cracks, crevices, gaps, or other spaces in or between building or structural units. For example, in FIG. 1, the foamed composition 100 is applied to seal cracks 20 that exist between adjacent wall board members 22 of the building structure. The foamable composition 100 is supplied to the crack from a pressurized spray canister 102.

Figure 2:
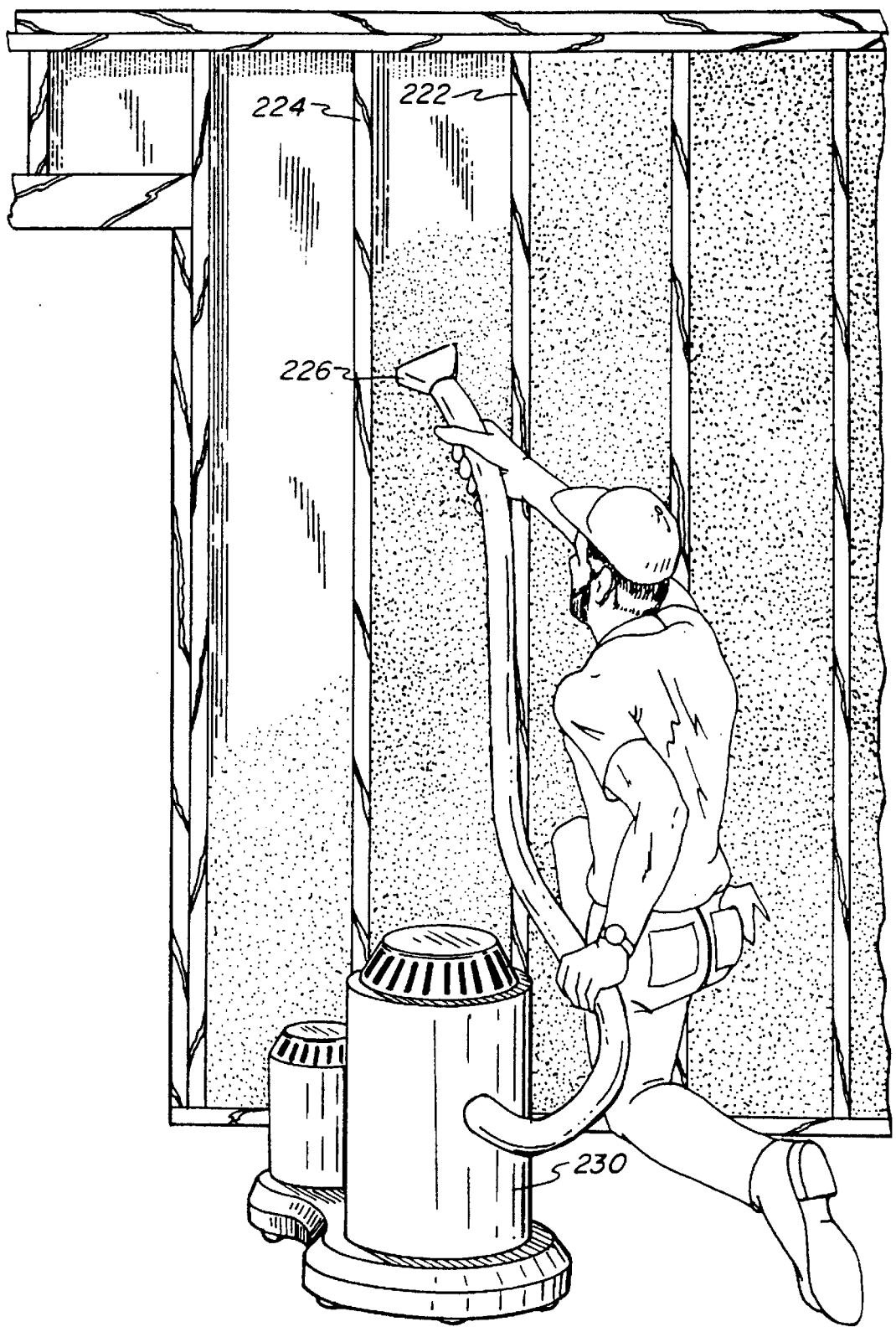
FIG. 2 is a schematic view showing use of the compositions to insulate building structures.

Similarly, the foamable compositions can be utilized to provide insulation in the construction industry. With regard to FIG. 2, the composition is applied in foamable form between wall stud members 222, 224. Here, the foamable composition is supplied through a wide-mouth nozzle means 226 from an enlarged pressurized canister 230 that may be conveniently strapped onto the back of the worker, in such manner, foams in accordance with the invention can be applied to provide thermal insulating sound dampening or moisture barrier like properties.

Figure 3:
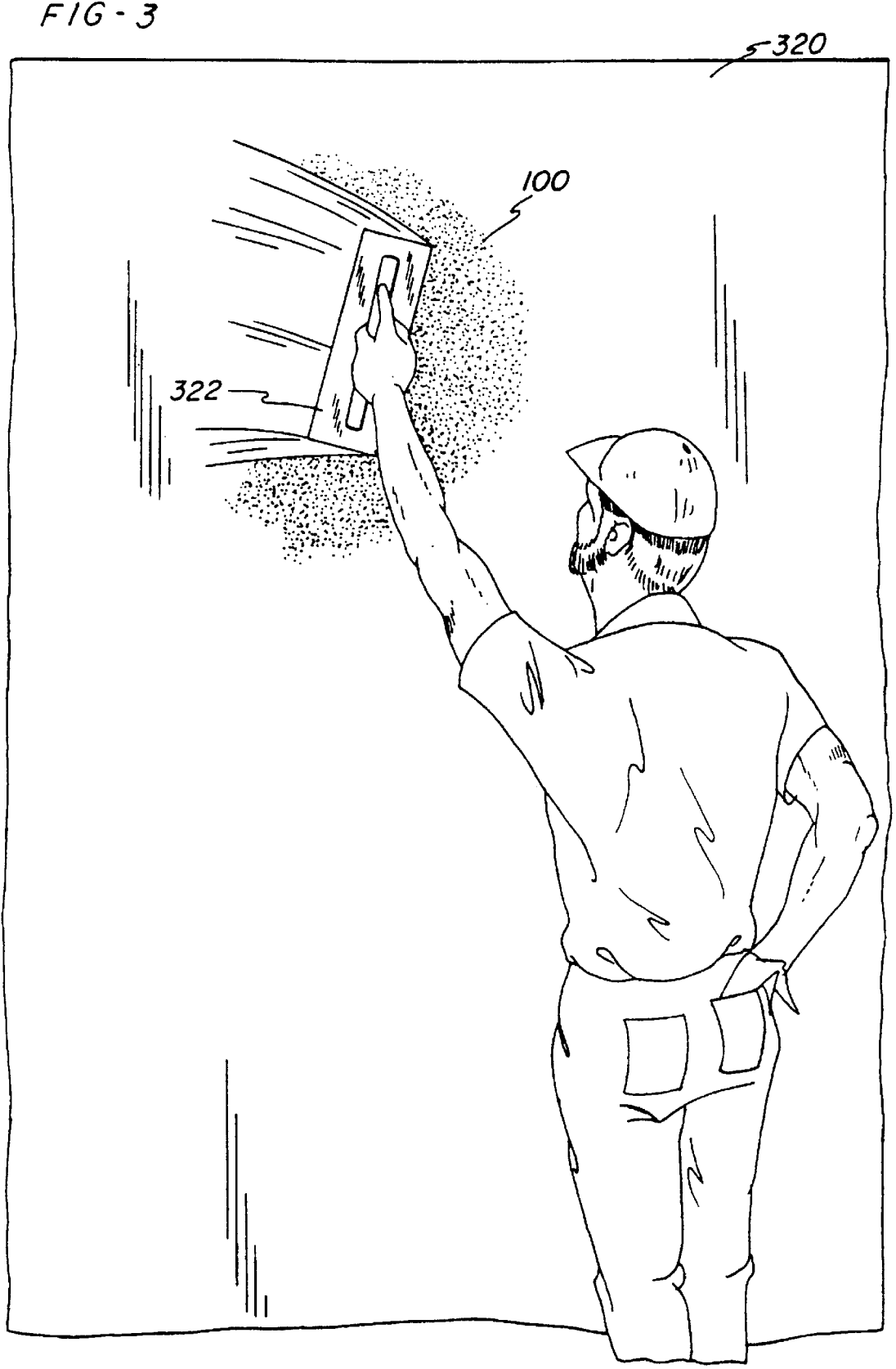
FIG. 3 is a schematic view highlighting use of the compositions of the invention in wall patching methods.

The compositions in accordance with the invention may be applied with appropriate tools or the like to the requisite substrate. As shown in FIG. 3, the foamable composition 100 of the invention is utilized as a patching material to fill concavities, or holes in the wall surface 320. The user simply applies a mass or mound of the composition 100 into the desired concavity and works the composition with a trough 322. After the foamable composition sets up, a smooth surface is provided.

Figure 4:
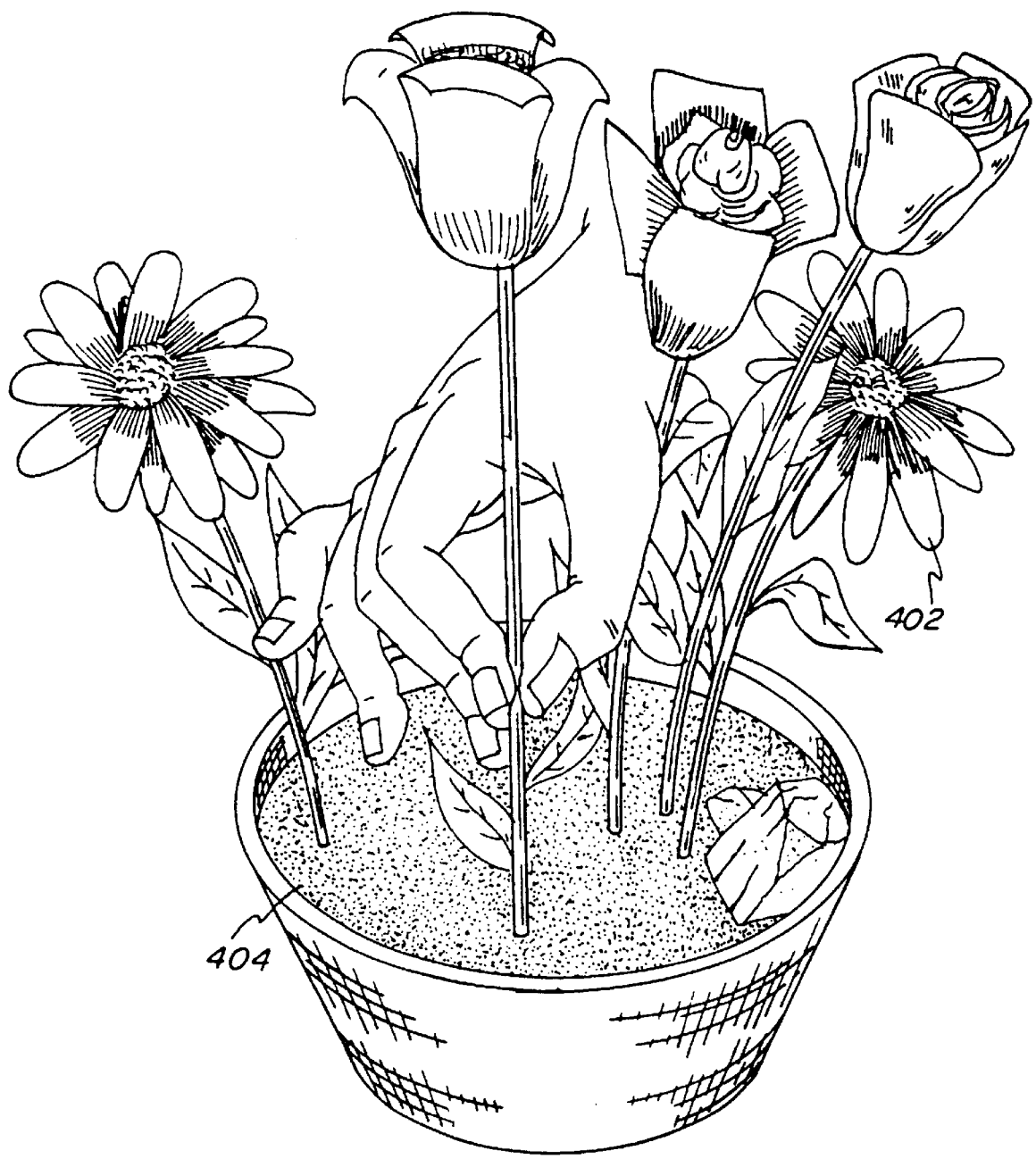
FIG. 4 is a schematic view showing an artificial terrain composed of the instant foamable compositions, shown here as a mount for a floral display.

As shown in FIG. 4, the foamable composition may also be utilized to provide an artificial terrain 404, for a variety of craft and hobby purposes. Here, the foamable composition is supplied, and formed into the requisite artificial terrain 404 which provides as an anchor site or means for supporting a plurality of flowers 402. Although the artificial terrain 404 is shown here in conjunction with and as providing a support for flowers 402, the foamable compositions can be used to supply similar terrains or background materials for a host of other craft or hobby items.

Figure 5:
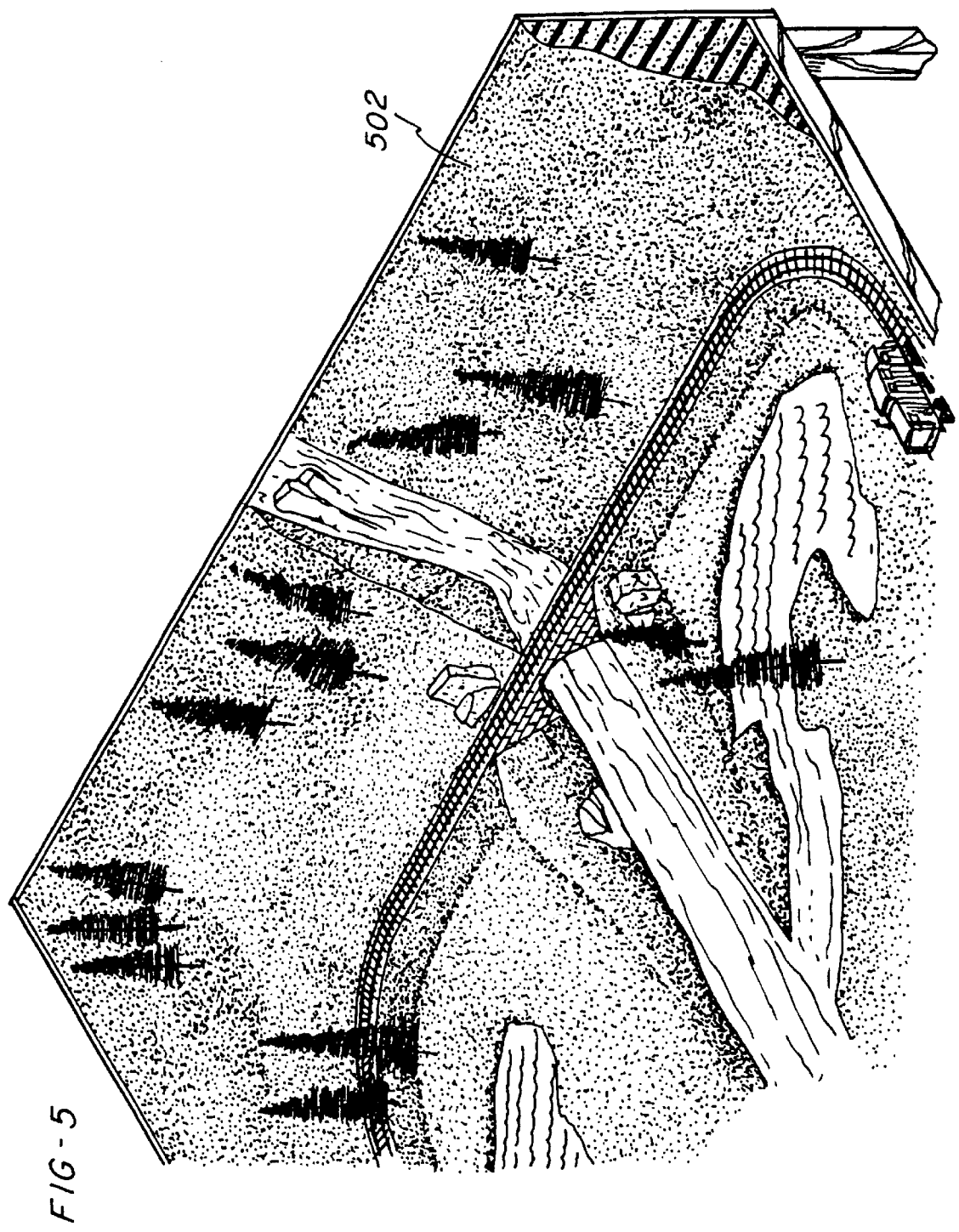
FIG. 5 is a schematic view of a model train set-up, having an artificial terrain background composed of the foamable compositions of the invention.

In FIG. 5, the scenic background 502 formed of the foamable compositions of the invention, is utilized to provide a planned, artificial topography for a model railroad set.

The latex polymer foam compositions of the invention have a natural home in the craft market due to the convenience and safety of a water based foam. The toy market for this foam technology is attractive for the same reasons. This latex polymer foam technology has application in automotive and industrial equipment manufacturing as an insulating sealant or adhesive. Other industrial applications may include the use of open-celled foams for sewage treatment, filtration devices, anion/cation exchange resins, and microbiological growth medias. Medical applications could include the investigation of open-celled foams for tissue grafting or biomedical implants and stabilization of biological macromolecules such as proteins, cellulosics, and polysaccharides into foam products.

The foams in accordance with the invention may be used as an encapsulating or coating medium for application over toxic and/or other hazardous materials. For example, asbestos bearing structural units such as walls, roofs and flooring may simply be coated with the foam compositions. After drying, the thus covered structural units would exhibit reduced airborne contaminant expulsion. Possibly the foams could even be used to encapsulate radioactive materials.

As previously noted, latex foam compositions of the invention may be used as a foam insulating sealant, ceiling texture, non-shrink caulk, textured patching compound, stucco repair product, white glue. construction adhesive, spackling and hand cleanser.

There are a myriad of other potential uses for these compositions. The following are mentioned as possibilities:
1) crack filling applications
2) component in wallboard tape/mud replacement products
3) component in driveway crack sealer
4) component in foam-in-place bug repellant
5) component in smoke/fire containment product
6) pipe insulation sealant
7) painter's caulk
8) component in foam-in-place gasket material
9) component in sound absorber
10) component in adhesive grout
11) component in alignment aid—temporary tack-in-place
12) component in foam-in-place leveler/gap filler/adhesive
13) component in replacement for white glues
14) component in bulk caulk delivery system
15) component in moisture barrier Many of these compositions lend themselves to bulk application techniques well suited for the manufactured housing market. Others like the patching and repair products are better suited to the convenient "no gun needed" aerosol can.

Unlike competitive polyurethane foams the instant foamable compositions contain no isocyanates which are skin and respiratory sensitizers. (Once sensitized, exposure to isocynates can cause respiratory failure.) The instant compositions will not permanently bond to the skin and can be easily removed by water cleanup. Polyurethane requires a hazardous flammable solvent for its removal. The compositions of the invention are easy to control during application. They are toolable and moldable, and they are reusable eliminating the waste and mess of polyurethane foam. Moreover, the foam compositions are paintable with all paints. Oil based paints (including virtually all spray paint) will dissolve polyurethane foam. The instant foam compositions do not require painting for exterior applications because they are UV stable. They remain white and will not discolor or degrade like polyurethane foam. The compositions exhibit no hydraulic effect to cause buckling or structural failure.

While this invention has been described with respect to particular embodiments thereof it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Method of providing an insulating layer between structural units comprising applying a layer of a foamable composition adjacent one of said structural units, said foamable composition comprising:
   (a) an aqueous emulsion comprising a film forming polymer
   (b) a liquid propellant; and
   (c) a solid, lipophilic non-ionic surfactant having an HLB value of about 3–8, said composition exhibiting a volumetric expansion about 18–24 hours after said dispensing of about 0.45 and greater.

2. Method as recited in claim 1 wherein said film forming polymer comprises an emulsion including polyvinylacetate/ethylene copolymer and styrene/acrylic copolymer.

3. Method as recited in claim 1 wherein said propellant comprises a liquefied gas component including a lower ($C_1$–$C_6$) alkane or ($C_1$–$C_6$) lower alkene.

4. Method as recited in claim 1 wherein said lower ($C_1$–$C_6$) alkane is present and comprises propane, isobutane, and n-butane.

5. Method as recited in claim 3 wherein said propellant further comprises DME, and wherein said lower ($C_1$–$C_6$) alkane is present said DME being present in a ratio by volume of DME: lower ($C_1$–$C_6$) alkane of from about 1: about 1–5.

6. Method as recited in claim 5 wherein said DME is present in a ratio by volume of DME: lower ($C_1$–$C_6$) alkane of about 1:2.

7. Method as recited in claim 1 wherein said surfactant comprises a member selected from the group consisting of fatty alcohol ethers, fatty acid esters and fatty acid amides.

8. Method as recited in claim 7 wherein said surfactant has an HLB of about 3.5– about 6.

9. Method as recited in claim 8 wherein said fatty alcohol ether comprises an alkoxylated fatty alcohol.

10. Method as recited in claim 9 wherein said fatty alcohol ether comprises ethoxylated (2 moles) cetyl alcohol.

11. Method as recited in claim 9 wherein said fatty alcohol ether comprises ethoxylated stearyl alcohol.

12. Method as recited in claim 8 wherein said fatty amide comprises an amide of stearic acid.

13. Method as recited in claim 8 wherein said fatty acid ester comprises an ethylene glycol ester of stearic acid.

* * * * *